(12) United States Patent
Madej

(10) Patent No.: US 8,799,442 B2
(45) Date of Patent: *Aug. 5, 2014

(54) SYSTEM AND METHOD FOR DEVICE MANAGEMENT

(71) Applicant: Research In Motion Limited, Waterloo (CA)

(72) Inventor: Piotr Madej, Mississauga (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/734,172

(22) Filed: Jan. 4, 2013

(65) Prior Publication Data

US 2013/0124620 A1    May 16, 2013

Related U.S. Application Data

(63) Continuation of application No. 12/117,006, filed on May 8, 2008, now Pat. No. 8,370,471.

(60) Provisional application No. 60/917,233, filed on May 10, 2007.

(51) Int. Cl.
*G06F 15/173* (2006.01)
*H04L 12/24* (2006.01)
*H04L 29/08* (2006.01)

(52) U.S. Cl.
CPC ............ *H04L 41/0226* (2013.01); *H04L 41/08* (2013.01); *H04L 67/04* (2013.01)
USPC ........................................ 709/223

(58) Field of Classification Search
CPC ...... H04L 41/0226; H04L 41/08; H04L 67/04
USPC .................................. 709/223, 226
See application file for complete search history.

(56) References Cited

U.S. PATENT DOCUMENTS

| | | | |
|---|---|---|---|
| 5,452,433 | A | 9/1995 | Nihart et al. |
| 5,991,795 | A | 11/1999 | Howard et al. |
| 6,985,697 | B2 | 1/2006 | Smith et al. |
| 7,000,238 | B2 | 2/2006 | Nadler et al. |
| 7,055,149 | B2 | 5/2006 | Birkholz et al. |

(Continued)

FOREIGN PATENT DOCUMENTS

| | | |
|---|---|---|
| EP | 0996253 | 4/2000 |
| EP | 1170664 | 1/2002 |

(Continued)

OTHER PUBLICATIONS

Nokia, "Nokia wins a Unified Device Management solution deal with Elisa-Press Release", http://press.nokia.com/PR/200605/1051294_5.html; May 16, 2006.

(Continued)

*Primary Examiner* — Kristie Shingles
(74) *Attorney, Agent, or Firm* — Norton Rose Fulbright Canada LLP

(57) ABSTRACT

A system for managing one or more wireless devices in a wireless network, the system comprising: a single generic device manager for implementing device management operations; and an interface layer for translating administration client-specific requests to the generic device manager.

21 Claims, 7 Drawing Sheets

(56) References Cited

U.S. PATENT DOCUMENTS

| | | |
|---|---|---|
| 7,146,541 B2 | 12/2006 | Blumberg et al. |
| 7,178,153 B1 | 2/2007 | Surlaker et al. |
| 7,184,554 B2 | 2/2007 | Freese |
| 7,191,435 B2 | 3/2007 | Lau et al. |
| 7,290,708 B2 | 11/2007 | Haller |
| 7,313,791 B1 | 12/2007 | Chen et al. |
| 7,320,010 B2 | 1/2008 | Peng |
| 7,630,877 B2 | 12/2009 | Brown et al. |
| 8,370,471 B2 * | 2/2013 | Madej .................. 709/223 |
| 2004/0233910 A1 | 11/2004 | Chen et al. |
| 2006/0136601 A1 | 6/2006 | Arora et al. |
| 2006/0230057 A1 | 10/2006 | Kosov et al. |
| 2008/0046463 A1 | 2/2008 | Haller |

FOREIGN PATENT DOCUMENTS

| | | |
|---|---|---|
| EP | 1513317 | 3/2005 |
| WO | 0219116 | 3/2002 |
| WO | 2004049314 | 6/2004 |

OTHER PUBLICATIONS

Stephen D. Drake, "Demonstrating the Business Value of Mobile Device Management in the Enterprise", White Paper; IDS Information and Data, Oct. 2006.

"Intel guns for remote wireless device management", InfoWorld; Oct. 25, 2004; http://www.inforworld.com/article/04/10/25/HNintelremotemgmt_1.html.

Scott, Anne-Marie—Canadian Intellectual Propery Office, "Examiner's Requisition" for corresponding Canadian Patent Application No. 2,630,934, dated Apr. 16, 2010, Canada.

Ogilvy Renault, "Response to Examiner's Requisition" for corresponding Canadian Patent Application No. 2,630,934, dated Oct. 14, 2010, Canada.

Scott, Anne-Marie—Canadian Intellectual Propery Office, "Examiner's Requisition" for corresponding Canadian Patent Application No. 2,630,934, dated May 4, 2011, Canada.

Norton Rose OR LLP, "Response to Examiner's Requisition" for corresponding Canadian Patent Application No. 2,630,934, dated Oct. 19, 2011, Canada.

* cited by examiner

SYSTEM AND METHOD FOR DEVICE MANAGEMENT

CROSS-REFERENCE TO RELATED APPLICATIONS

This disclosure claims priority from U.S. Provisional Application No. 60/917,233, the disclosure of which is hereby incorporated by reference in its entirety.

TECHNICAL FIELD

The present disclosure relates to wireless communications devices, and in particular to a system and method for device management.

BACKGROUND

The number and variety of wireless terminal devices, such as mobile telephones, personal computers and personal digital assistants (PDAs) with wireless communication capabilities, self service kiosks and two-way pagers is rapidly increasing. Software applications which run on these devices increase their utility. For example, a mobile phone may include an application which retrieves the weather for a range of cities, or a PDA may include an application that allows a user to shop for groceries. These software applications take advantage of wireless connectivity to a data network (such as the interne) in order to provide timely and useful services to users.

As is well known in the art, the various software applications installed on any given terminal device may be developed by respective different application providers. Software application developers frequently produce new and/or updated versions of their software. Such software updates may be released on a very frequent basis, as, for example, in the case of patches to resolve defects in previously released software. Major upgrades may be released on, for example, a yearly or bi-yearly basis, and often provide new functions to enhance the utility of a particular device.

However, while software developers may readily develop and release software updates, actual implementation of updates on all of the affected wireless devices is highly complex. For example, in a wireless network, connectivity is frequently intermittent, so that a particular device may not be connected to a network when an update is released. In this case, some means is needed to enable the update to be downloaded and installed at some later time. Even when this is accomplished, some devices may lack resources (such as sufficient memory) to download and successfully install a particular update. In other cases, an application update may require that a device's controller software be updated before the application update is installed. In still other cases, a series of application updates must be downloaded and installed in a particular order.

A further complicating factor is that application developers may use any of a variety of different systems to manage the implementation of their software upgrades. For example, many software developers use a Web-based Graphical User Interface (GUI) to interact with the service provider server to manage upgrades, while others may prefer to use an extensible markup language (XML) interface or an Open Mobile Alliance standard device management proxy interface. Further, XML may be exchanged using Web Service or SOAP as the protocol, or may be sent over hypertext transfer protocol (HTTP) directly.

Methods and techniques that simplify device management by overcoming at least some the of above difficulties remain highly desirable.

BRIEF DESCRIPTION OF THE DRAWINGS

Further features and advantages of the present technique will become apparent from the following detailed description, taken in combination with the appended drawings, in which.

It will be noted that throughout the appended drawings, like features are identified by like reference numerals.

DETAILED DESCRIPTION

In some aspects, there is provided a system for managing one or more wireless devices in a wireless network, the system comprising: a single generic device manager for implementing device management operations; and an interface layer for translating administration client-specific requests to the generic device manager.

In some aspects, there is provided a method of managing one or more wireless devices in a wireless network, the method comprising: providing a single generic device manager for implementing device management operations; receiving an administration client-specific request from an administration client, the administration client-specific request containing a set of device management operations; translating the administration client-specific requests using an interface layer for translating administration client-specific requests to the generic device manager; and implementing the set of device management operations on the one or more wireless devices using the generic device manager.

In the system and method described above, the interface layer may comprise one or more interface modules for interfacing with one or more administration clients.

The system and method described above may be used for management of software applications in the one or more wireless devices.

In some aspects, there is provided a computer program product for carrying out the method described above.

In general, the present disclosure provides a device management system which includes a generic device manager and an interface layer that supports interaction between the device manager and administration clients implemented using any of a variety of different techniques and communications protocols. By "generic" is meant that the device manager is not specific to any particular communication protocol or standards. Rather than requiring all administration clients to use a single unified management platform, or requiring all device management to be carried out using a single client, different administration clients having different protocols and platforms are able to each individually manage devices using a generic device manager. As well, a single device manager, which may implement many complex device management operations, may be used for all different administration clients. This avoids have to duplicate many device managers, which may be quite complex, for each different protocol or standard used by each different administration client. Embodiments are described below, by way of example only, with reference to FIGS. 1 and 2.

Figure 1:
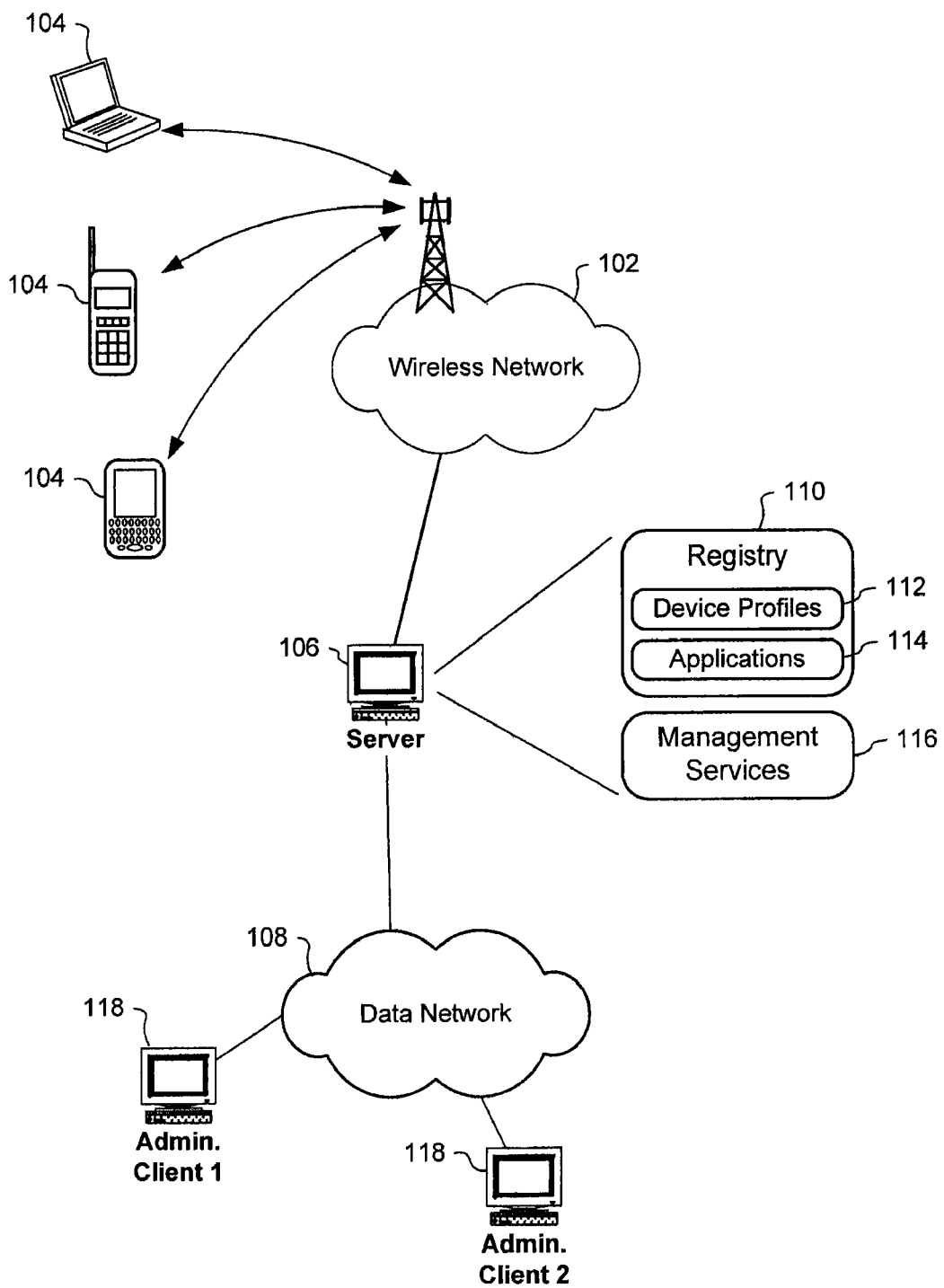
FIG. 1 is a block diagram schematically illustrating a network system suitable for implementing a system for device management.

As shown in FIG. 1, in a typical wireless network 102, a plurality of wireless devices 104 are hosted by a server 106 of a service provider, typically in accordance with the terms of a service contract between the service provider and the owner of the wireless device. Typically, the server 106 may be coupled to a data network 108 (such as, for example, any one or more of a Local Area Network, an intranet or the internet so as to enable authorized parties to access management functionality of the server 106, as will be explained in greater detail below.

The server may provide a registry 110, which may be co-resident with the server 106 or may be located remotely from the server 106 and accessed via the data network 108. The registry 110 generally comprises a profiles registry 112 and an applications registry 114. The profiles registry 112 may contain, for each terminal device 104, a respective profile which may contain information identifying each software application installed on that terminal device 104, and possibly additional information such as the version of the installed software. The applications registry 114 may contain information identifying wireless applications that are available to the terminal devices 104, and possibly also addresses (e.g. Universal Resources Look-ups—URLs) of respective back-end data sources and/or web services of the data network 108 that may be accessed by each application.

The server 106 may also provide device management services 116, which may be co-resident with the server 106 or may be located remotely from the server 106 and accessed via the data network 108.

In general, the device management services 116 may provide a mechanism by which authorized parties may manage the implementation of software updates to the wireless devices 104 hosted by the server 106. For the purposes of the present disclosure, "authorized parties" may include any party who is authorized to access and use the management services 116. These may include software application developers, device manufacturers, network service carriers etc. Typically, each authorized party will use an Administration Client application 118 to interact with the management services 116, via the data network 108, as shown in FIG. 1.

Using the administration client 118, an authorized party may access the device management services 116 to perform any of a variety of management operations. Representative operations that may be performed include:

Search for devices to be upgraded based on a set of criteria, which may or may not be predetermined. This operation may involve searching the profiles registry 112 and applications registry 114;

Select batches of devices to be upgraded;

Search for available upgrades based on a set of criteria, which may or may not be predetermined, and which may include the selected devices;

Select an upgrade to be implemented;

Enter a desired upgrade schedule, routing parameters, upgrade severity level, and an initiation schedule, which may include exception dates and maximum number of initiations per day;

Initiate upgrade of selected devices, for example by sending an XML message to each selected device;

Monitor progress of the upgrade operation, for example across all of the selected devices and/or the progress of individual devices;

Revert one or more devices to a previous version;

Send a request for configuration information to a device; and

Collect status information from one or more devices.

The administration client 118 may be implemented using any of a variety of techniques known in the art, and may communicate with the management services 116 using any of a variety of protocols. For example, the administration client 118 may be implemented as a browser-based Graphical User Interface (GUI). Administration clients may also be implemented using XML (which may be, for example, exchanged using Web Service or SOAP as the protocol, or may be sent over HTTP directly), using the Open Mobile Alliance standards, and/or any other custom or standard interface.

Figure 2:
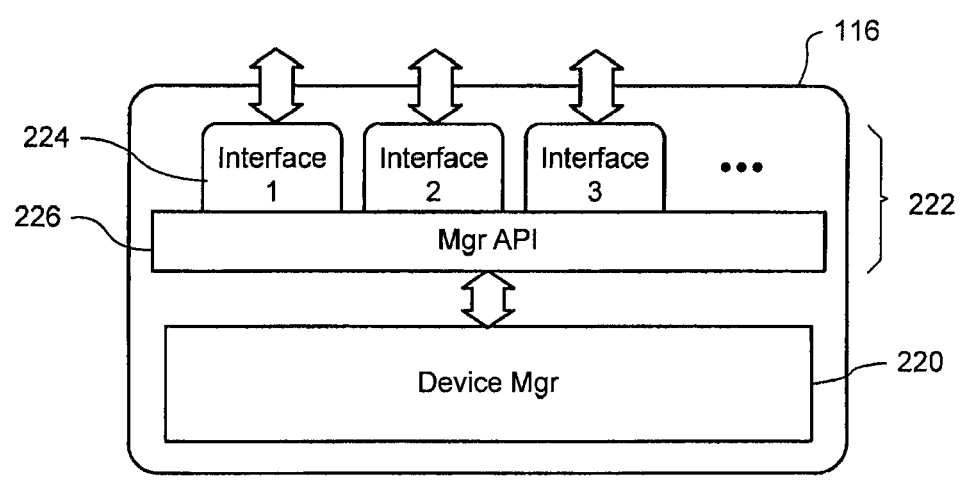
FIG. 2 is a block diagram schematically illustrating components and operation of device management services in accordance with an embodiment.

Reference is now made to FIG. 2, showing a system for device management in accordance with an embodiment of this disclosure. In order to facilitate provision of a consistent range of device management functionality to authorised parties using any of a variety of different administration clients 118, the management services 116 are preferably implemented by means of a generic device manager 220 and an interface layer 222.

The device manager 220 may be configured as one or more software components which operate to provide the device management functionality described above. In addition, the device manager exposes a Manager Application Program Interface (Mgr API) 226 by which the device management functionality can be accessed by an administration client 118.

The interface layer 222 operates to mediate signalling between each administration client 118 and the device manager 220. In general, the interface layer 222 operates to translate between the Mgr API 226 and the particular signalling format and protocol of the administration client 118. In a simple embodiment, a respective different interface module 224 may be configured for each known type of known management client 118. For example, a first interface module may be configured to support web browser-based administration client applications (GUIs); a second interface module configured to support XML-based administration clients (e.g., exchanged using Web Service or SOAP as the protocol, or sent over HTTP directly); and a third interface module configured as an Open Mobile Alliance standard device management proxy. There may be other interface modules to support other custom or standard protocols (e.g., electronic data interchange (EDI)). Interface modules may be added or modified as necessary to accommodate new or different protocols or standards. With this arrangement, each interface module 224 may be configured as a thin client that translates administration client-specific requests into Mgr API 226 calls to the Device Manager 220, for example.

This arrangement may allow the service provider to deploy a single centralized engine (e.g., the device manager 220) containing all of the rules and logic that will allow authorized parties to perform any of a variety of device management operations, and allow authorized parties to interface with the centralized engine using any administration client technology and any message format. Rather than requiring each authorized party to use the same administration client technology or protocol, or requiring all device management to be carried out through a single client, this system for device management allows individual authorized parties to manage devices using their own administration client, without any changes to their technology or protocol. This system may be adaptable to different administration clients by updating or adding interface modules 224 as necessary for each administration client.

Figure 3:
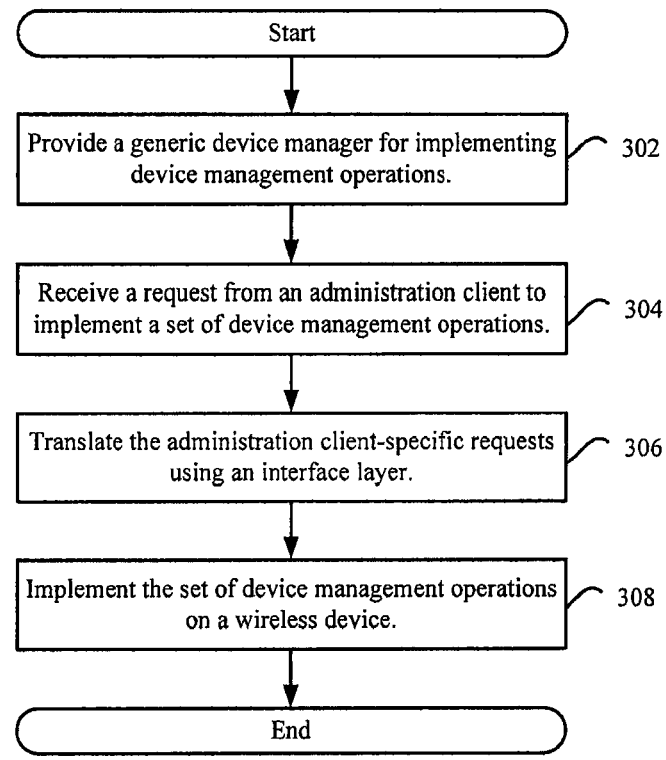
FIG. 3 is a flowchart illustrating a method of device management in accordance with an embodiment.

Reference is now made to FIG. 3, which shows a flowchart illustrating a method of device management in accordance with an embodiment of the present disclosure.

At a step 302, a generic device manager is provided, which allows for implementation of device management operations. The device manage is not specific to any particular communication protocol or standard. The device manager may be stored in a service provider, as described above, as part of a system for device management.

At a step 304, the system receives a request from an administration client to implement a set of device management operations on one or more wireless devices. The request may be specific to the administration client—that is, the request may use a protocol or standard that is specific to the administration client. The request contains a set of device management operations, which may include any one of the operations described above.

At a step 306, the administration client-specific request is translated using an interface layer, such as an interface module and Mgr API as described above. This step translates the request, which may be in a standard specific to the administration client, into a generic request that can be handled by the generic device manager. Thus, the device manager does not need to known what protocol or standard is being used by the administration client, nor does the administration client need to know what protocol or standard is accepted by the device manager. Nor is it necessary to have separate device managers to handle requests from administration clients using different protocols or standards.

At a step 308, the device manage implements the set of device management operations on the one or more wireless devices.

Figure 4:
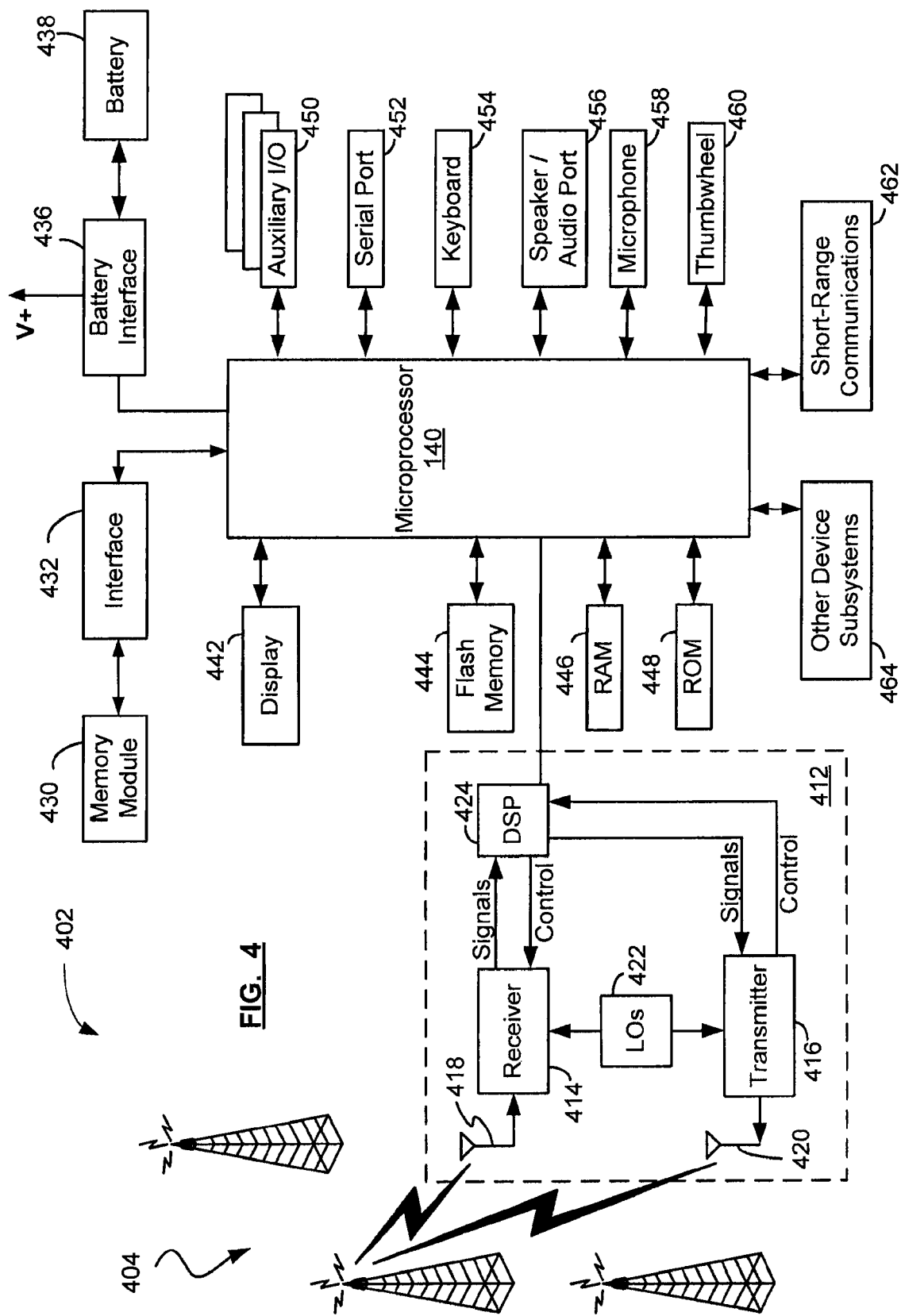
FIG. 4 shows in block diagram form a wireless device that may be managed by a system for device management.

Reference is now made to FIG. 4, which shows a block diagram illustrating a wireless device 104 that may be managed by the system and method for device management in accordance with an embodiment of the present disclosure. The wireless device 104 communicates through a wireless communication network 404. The wireless network 404 includes antennae, base stations, and supporting radio equipment as for supporting wireless communications between the wireless device 104 and other devices connected to wireless network 404. The wireless network 404 may be coupled to a wireless network gateway and to a wide area network, shown in FIG. 5.

In an embodiment, the wireless device 104 is a two-way mobile communication device having at least voice and data communication capabilities, including the capability to communicate with other computer systems. Depending on the functionality provided by the wireless device 104, it may be referred to as a data messaging device, a two-way pager, a cellular telephone with data messaging capabilities, a wireless Internet appliance, a data communication device (with or without telephony capabilities), a personal computer, or a laptop computer. The wireless device 104 may communicate with any one of a plurality of fixed transceiver stations within its geographic coverage area.

The wireless device 104 may incorporate a communication subsystem 412, which includes a receiver 414, a transmitter 416, and associated components, such as one or more antenna elements 418 and 420, local oscillators (LOs) 422, and a processing module such as a digital signal processor (DSP) 424. In an embodiment, the antenna elements 418 and 420 may be embedded or internal to the wireless device 104. As will be apparent to those skilled in the field of communications, the particular design of the communication subsystem 412 depends on the wireless network 404 in which the wireless device 104 is intended to operate.

The wireless device 104 may send and receive communication signals over the wireless network 404 after the required network registration or activation procedures have been completed. Signals received by the antenna 418 through the wireless network 404 are input to the receiver 414, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 424. In a similar manner, signals to be transmitted are processed, including modulation and encoding, for example, by the DSP 424. These DSP-processed signals are input to the transmitter 416 for digital-to-analog (D/A) conversion, frequency up conversion, filtering, amplification, and transmission to the wireless network 404 via the antenna 420. The DSP 424 not only processes communication signals, but also provides for receiver and transmitter control. For example, the gains applied to communication signals in the receiver 414 and the transmitter 416 may be adaptively controlled through automatic gain control algorithms implemented in the DSP 424.

Network access is associated with a subscriber or user of the wireless device 104 via a memory module, such as a memory module 430, which may be a Subscriber Identity Module (SIM) card for use in a GSM network or a Universal Subscriber Identity Module (USW) card for use in a Universal Mobile Telecommunication System (UMTS). The SIM card is inserted in or connected to an interface 432 of the wireless device 104 in order to operate in conjunction with the wireless network 404. Alternatively, the wireless device 104 may have an integrated identity module for use with systems such as Code Division Multiple Access (CDMA) systems.

The wireless device 104 also includes a battery interface 436 for receiving one or more rechargeable batteries 438. The battery 438 provides electrical power to at least some of the electrical circuitry in the wireless device 104, and the battery interface 436 provides a mechanical and electrical connection for the battery 438. The battery interface 436 is coupled to a regulator (not shown) which provides power V+ to the circuitry of the wireless device 104.

The wireless device 104 includes a microprocessor 440 which controls the overall operation of the wireless device 104. Communication functions, including at least data and voice communications, are performed through the communication subsystem 412. The microprocessor 440 also interacts with additional device subsystems such as a primary display 442, a flash memory 444, a random access memory (RAM) 446, a read-only memory (ROM) 448, auxiliary input/output (I/O) subsystems 450, a data port such as serial port 452, a keyboard or keypad 454, a speaker or audio port 456 for connecting to, for example a set of headphones or an earpiece, a microphone 458, a clickable thumbwheel or thumbwheel 460, a short-range communications subsystem 462, and any other device subsystems generally designated as 464. Some of the subsystems shown in FIG. 4 perform communication-related functions, whereas other subsystems may provide "resident" or on-device functions. Notably, some subsystems, such as the keypad 454, the display 442, and the clickable thumbwheel 460, for example, may be used for both communication-related functions, such as displaying notifications or entering a text message for transmission over the wireless network 404, and executing device-resident functions such as a clock, a calculator or a task list. Operating system software used by the microprocessor 440 is preferably stored in a persistent store such as the flash memory 444, which may alternatively be the ROM 448 or similar storage element. Those skilled in the art will appreciate that the operating system, specific device applications, or parts thereof, may be temporarily loaded into a volatile store such as the RAM 446.

The microprocessor 440, in addition to its operating system functions, enables execution of software applications on the wireless device 104. A predetermined set of applications that control basic device operations, including data and voice communication applications, will normally be installed on the wireless device 104 during or after manufacture. The wireless device 104 may include a personal information manager (PIM) application having the ability to organize and manage data items relating to a user such as, but not limited to, instant messaging, email, calendar events, voice mails, appointments, and task items. One or more memory stores may be available on the wireless device 104 to facilitate storage of information, such as the flash memory 444, the RAM 446, the ROM 448, the memory module 430, or other types of memory storage devices or FLASH memory cards represented by the other device subsystems 464, such as Secure Digital (SD) cards or mini SD cards, etc.

The PIM and/or media applications have the ability to send and receive data items via either the wireless network 404 or a link to a computer system. The link to the computer system may be via the serial port 452 or the short-range communications subsystem 462. In an embodiment, PIM and/or media data items are seamlessly combined, synchronized, and updated via the wireless network 404, with the wireless device user's corresponding data items stored and/or associated with a host computer system thereby creating a mirrored or partially mirrored host computer on the wireless device 104 with respect to such items. This may be advantageous where the host computer system is the wireless device user's office computer system. Additional applications may also be loaded onto the wireless device 104 through the wireless network 404, the auxiliary I/O subsystem 450, the serial port 452, the short-range communications subsystem 462, or any other suitable subsystem 464, and installed by a user in the RAM 446 or a non-volatile store such as the ROM 448 for execution by the microprocessor 440. Such flexibility in application installation increases the functionality of the wireless device 104 and may provide enhanced on-device functions, communication-related functions, or both. For example, secure communication applications may enable electronic commerce functions and other such financial transactions to be performed using the wireless device 104.

In a data communication mode, a received data signal representing information such as a text message, an email message, a media file to be transferred, or Web page download will be processed by the communication subsystem 412 and input to the microprocessor 440. The microprocessor 440 will further process the signal for output to the primary display 442, or alternatively to the auxiliary I/O device 450. A user of the wireless device 104 may also compose data items, such as email messages, for example, using the keypad 454 and/or the clickable thumbwheel 460 in conjunction with the primary display 442 and possibly the auxiliary I/O device 450. The keypad 454 may be either a complete alphanumeric keypad or telephone-type keypad. These composed items may be transmitted through the communication subsystem 412 over the wireless network 404 or via the short range communication subsystem 462.

For voice communications, the overall operation of the wireless device 104 is similar, except that the received signals would be output to the speaker or audio port 456 and signals for transmission would be generated by a transducer such as the microphone 458. Alternative voice or audio I/O subsystems, such as a voice message recording subsystem, may also be implemented on the wireless device 104. Although voice or audio signal output is typically accomplished primarily through the speaker or audio port 456, the display 442 may also be used to provide an indication of the identity of a calling party, duration of a voice call, or other voice call related information. Stereo headphones or an earpiece may also be used in place of the speaker 456.

The serial port 452 is normally implemented in a personal digital assistant (PDA) type communication device for which synchronization with a user's computer is a desirable, albeit optional, component. The serial port 452 enables a user to set preferences through an external device or software application and extends the capabilities of the wireless device 104 by providing for information or software downloads to the wireless device 104 other than through the wireless network 404. The alternate download path may, for example, be used to load software or data files onto the wireless device 104 through a direct, reliable and trusted connection.

The short-range communications subsystem 462 is an additional optional component which provides for communication between the wireless device 104 and different systems or devices, which need not necessarily be similar devices. For example, the subsystem 462 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 462 may be a wireless networking communications subsystem, conforming to IEEE 802.11 standards such as one or more of 802.11b, 802.11g, or 802.11n.

Figure 5:
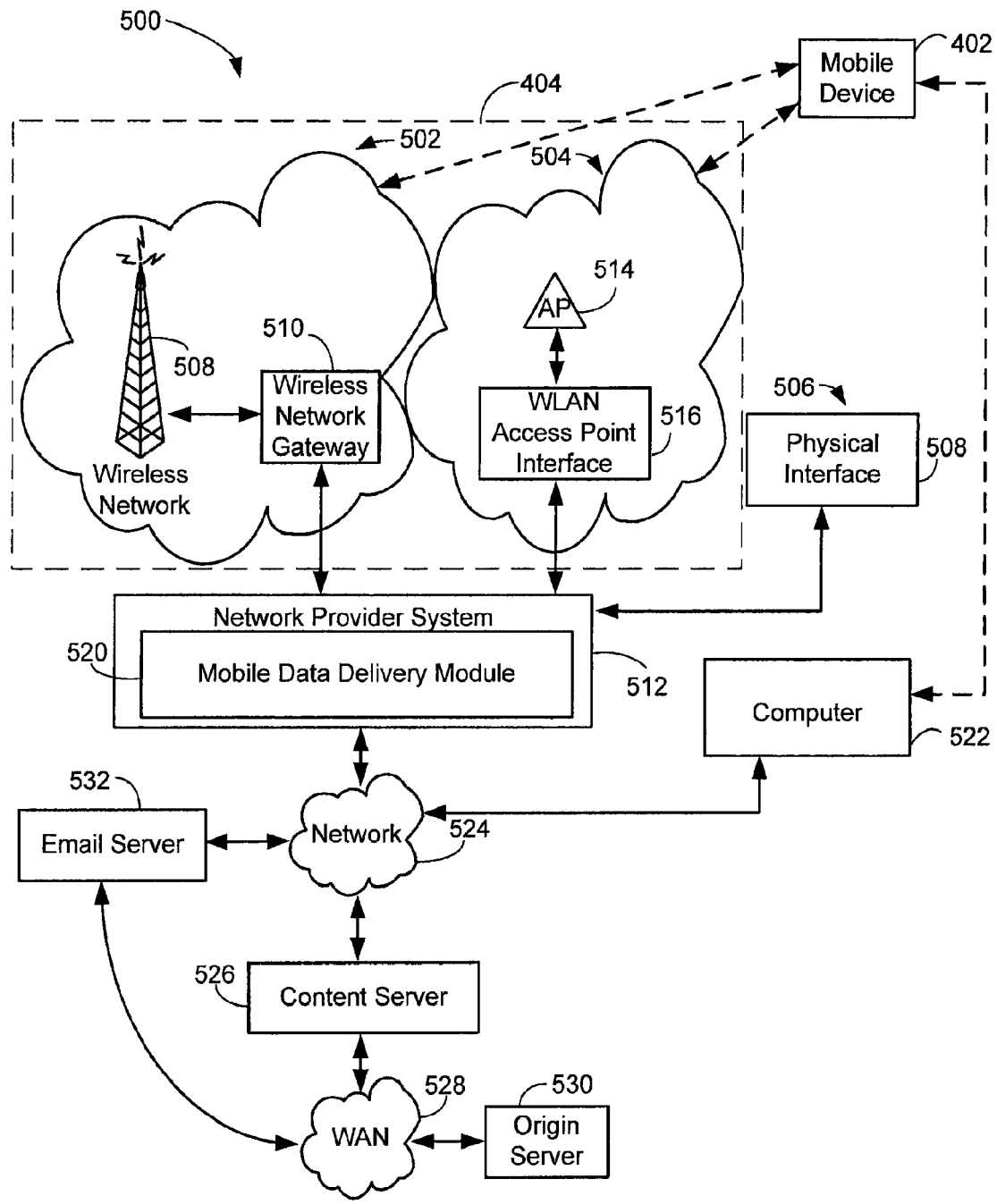
FIG. 5 shows in block diagram form a communication system suitable for providing the operating environment of the wireless device of FIG. 4.

Reference is next made to FIG. 5, which shows a communication system 500 suitable for use with the wireless device 104 shown in FIG. 4. The communication system 500 generally includes one or more wireless devices 104 (only one of which is shown in FIG. 5) and the wireless network 404. The wireless network 404 may include a wireless Wide Area Network (WAN) 502, a Wireless Local Area Network (WLAN) 504, and/or other interfaces 506 (which may not necessarily be wireless).

Referring to FIG. 5, the wireless WAN 502 may be implemented as a packet-based cellular or mobile network that includes a number of base stations 508 (one of which is shown in FIG. 5) where each of the base stations 508 provides wireless Radio Frequency (RF) coverage to a corresponding area or cell. The wireless WAN 502 is typically operated by a cellular network service provider that sells subscription packages to users of the wireless devices 104. The wireless WAN 502 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 5, the communications system 500 also includes a wireless network gateway 510 and one or more network provider systems 512. The wireless network gateway 510 provides translation and routing services between the network provider system(s) 512 and the WAN 502, which facilitates communication between the wireless devices 104 and other devices (not shown) connected, directly or indirectly, to the network provider system 512.

The WLAN 504 comprises a network which in some examples conforms to IEEE 802.11 standards such as one or more of 802.11b, 802.11g, or 802.11n; however, other communications protocols may also be used for the WLAN 504. The WLAN 504 includes one or more wireless RF Access Points (AP) 514 (one of which is shown in FIG. 5) that collectively provide a WLAN coverage area. For the embodiment depicted in FIG. 5, the WLAN 504 is operated by an enterprise (for example, a business or university in a building or campus type environment) and the access points 514 are connected to an access point (AP) interface 516. The AP interface 516 provides translation and routing services between the access points 514 and the network provider system 512 to facilitate communication between two or more of the wireless devices 104 and other devices (e.g., such as desktop computers) connected, directly or indirectly, to the network provider system 512. The AP interface 516 is implemented using a computer, for example, a server running a suitable computer program or software.

According to an embodiment, the other interfaces 506 may be implemented using a physical interface indicated by reference 518. The physical interface 518 includes an Ethernet, Universal Serial Bus (USB), Firewire, or infrared (IR) connection implemented to exchange information between the network provider system 512 and the wireless device 104.

The network provider system 512 comprises a server or server modules or a number of servers or server modules which are typically located behind a firewall (not shown). The network provider system 512 may include a number of modules including a mobile data delivery module 520. Various modules running on the network provider system 512 may be implemented as a number of services running on a single server or as a number of interconnected servers each running a software program to implement the functionality of the respective module. The network provider system 512 provides access for the wireless devices 104, through either the wireless WAN 502, the WLAN 504, or the other connection 506 to the devices connected, for example, through an enterprise network 524 (e.g., an intranet), to the network provider system 512. In an embodiment, the data delivery module 520 is implemented on a computer, such as the network provider system 512.

The enterprise network 524 comprises a local area network, an intranet, the Internet, a direct connection, or combinations thereof. The enterprise network 524 may comprise an intranet for a corporation or other type of organization. In at least some embodiments, the network provider system 512 is part of the enterprise network 524, and is located behind a corporate firewall and connected to the wireless network gateway 510 through the Internet. A computer 522 (e.g., a desktop or laptop computer) belonging to the user of the wireless device 104 is typically connected to the enterprise network 524. As described earlier, the wireless device 104 can be temporarily and directly connected to the computer 522 using, for example, the serial port 452. Alternatively, the wireless device 104 may communicate with the computer 522 using the communication subsystem 412 and the WAN 502 and/or the short-range communications subsystem 462 and the WLAN 504.

As shown in FIG. 5, an application/content server 526 may be connected to the enterprise network 524 and also to another network, for example a Wide Area Network (WAN) 528. In some embodiments, an email server 532 and/or the content server 526 form part of the enterprise network 524. The WAN 528 may further connect to other networks. The WAN 528 may comprise or be configured with the Internet, a direct connection, a LAN, a wireless communication link, or any combination thereof. Content providers, such as Web servers, may be connected to the WAN 528, an example of which is shown in FIG. 5 as an origin server 530.

According to an embodiment, the mobile data delivery module 520 provides connectivity between the wireless WAN 502 and the WLAN 504 and the other connection 506 and devices and/or networks connected directly or indirectly to the network provider system 512. In an embodiment, the connectivity provided may be Hypertext Transfer Protocol (HTTP) based connectivity providing an Internet based service connection to devices connected to the wireless WAN 502, the WLAN 504, or the other connection 506 and devices and/or networks connected directly or indirectly to the network provider system 512. The network 524, the application/content server 526, the WAN 528, and the origin server 530, are individually and/or collectively in various combinations a content source for the network provider system 512. It will be appreciated that the system shown in FIG. 5 comprises but one possible communication network or configuration of a multitude of possible configurations for use with the wireless devices 104.

Figure 6:
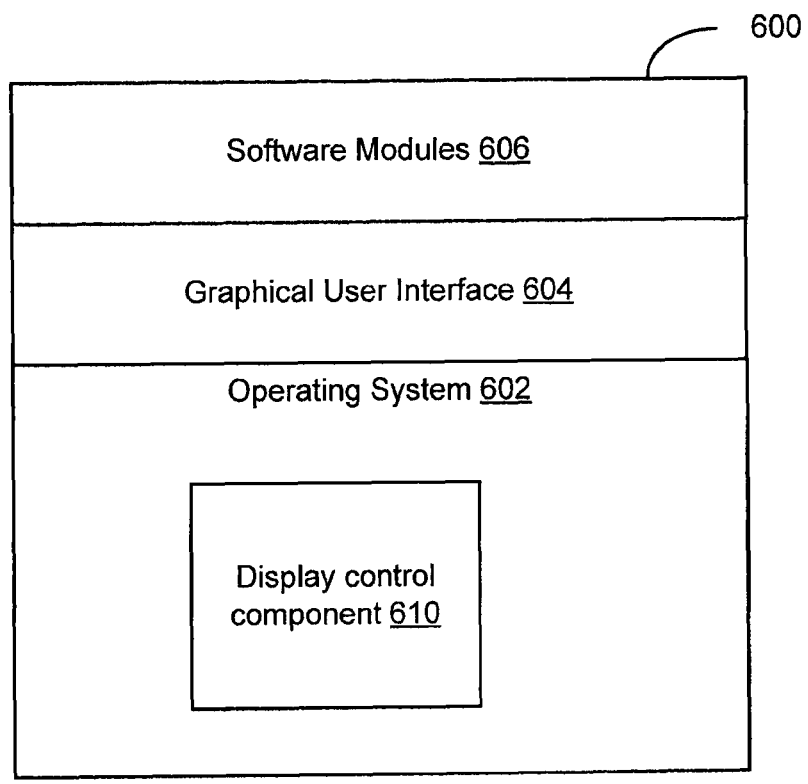
FIG. 6 shows in block diagram form the contents of a memory of the wireless device of FIG. 4.

Reference is next made to FIG. 6, which shows a block diagram illustrating a memory 600 of the wireless device 104. The memory 600 has various software components for controlling the wireless device 104 and may include, for example, the flash memory 444, the RAM 446, the ROM 448, the memory module 430 and/or the other device subsystems 464. In accordance with an embodiment, the wireless device 104 is intended to be a multi-tasking mobile communication device having multiple screens or displays for sending and receiving data items, such as instant messages, for making and receiving voice calls, and for creating events and alerts. To provide a user-friendly environment to control the operation of the wireless device 104, an operating system (OS) 602 resident on the wireless device 104 provides a basic set of operations for supporting various applications typically operable through a primary user interface such as a graphical user interface (GUI) 604.

The OS 602 may also comprise a display control component 610 for controlling the display 442. For example, the OS 602 provides basic input/output system features to obtain input from the auxiliary I/O 450, the keypad 454, the clickable thumbwheel 460, and other input devices, and to facilitate output to the user via the display 442. The GUI 604 is typically components of the OS 602. One or more software modules 606 for managing communications or providing a personal digital assistant (PDA) or other functions may also be included.

The memory 600 also includes an email and calendar client, which may be combined in, for example, a PIM application having email-based calendaring and scheduling functions. Typically, the PIM is installed as one of the software modules 606. Thus, the wireless device 104 includes computer executable programmed instructions for directing the wireless device 104 to implement various applications. The programmed instructions may be embodied in the one or more software modules 606 resident in the memory 600 of the wireless device 104. Alternatively, the programmed instructions may be tangibly embodied on a computer readable medium (such as a DVD, CD, floppy disk or other storage media) which may be used for transporting the programmed instructions to the memory 600 of the wireless device 104. Alternatively, the programmed instructions may be embedded in a computer-readable, signal-bearing medium that is uploaded to the wireless network 404 by a vendor or supplier of the programmed instructions, and this signal-bearing medium may be downloaded through one or more of the interfaces 412, 450, 452, 462 to the wireless device 104 from, for example, the wireless network 404 by end users.

Figure 7:
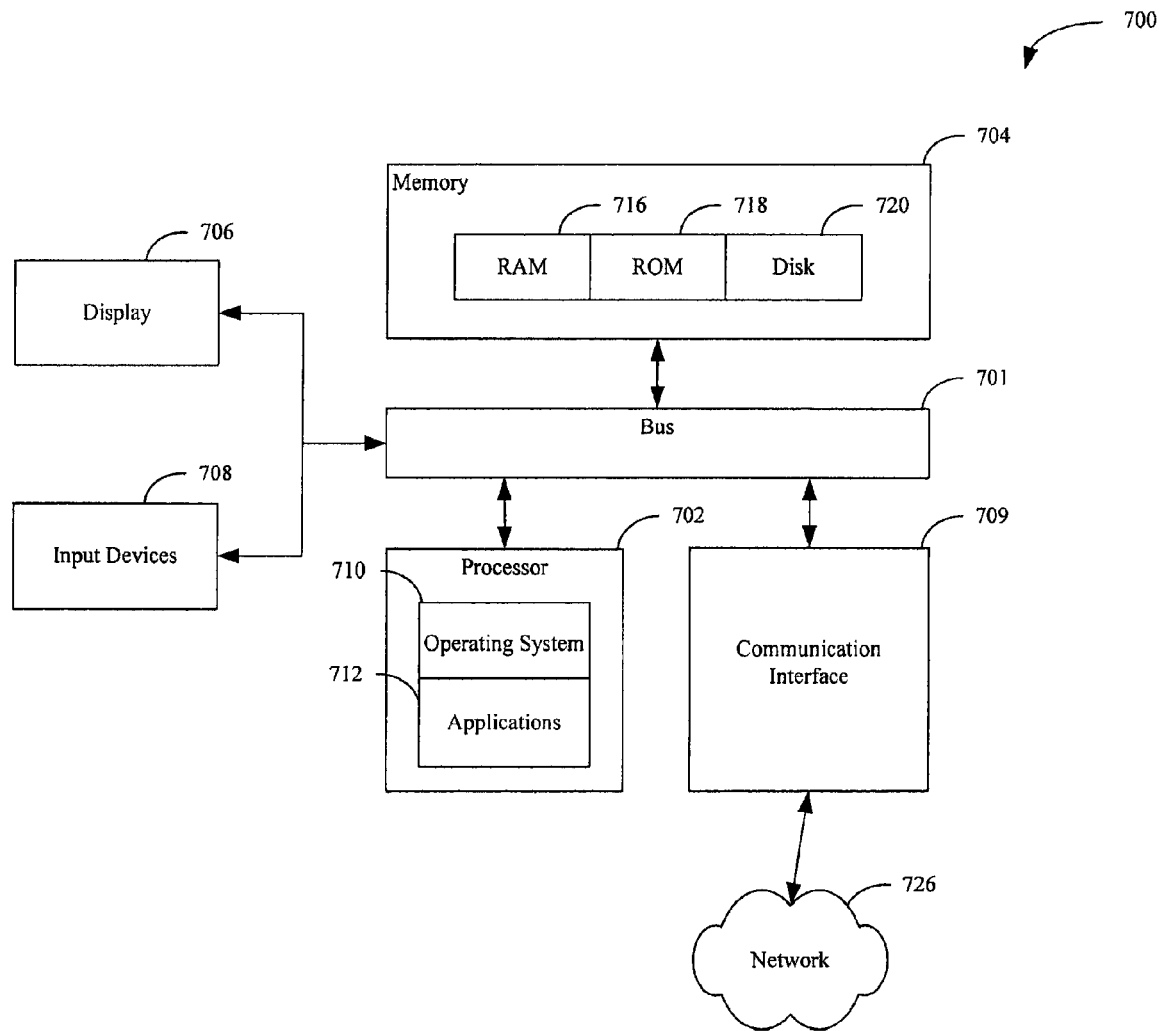
FIG. 7 is a schematic diagram illustrating a computing device that may be used to implement a system and method for device management.

More generally, FIG. 7 illustrates a computing device architecture 700 that may be used with the system and method described above. The computing device architecture 700 may be representative of the wireless device 104, the server 106, the administration client 108, or any of the computing devices described above. The computing device 700 generally may include a bus 701, a microprocessor or processor 702, a memory 704, a display 706, one or more user input devices 708, and a communication interface 709, which may all be coupled to the bus 701. The computing device 700 may additionally include a display device (not shown) for communicating an output to a user. In one example, the user input devices 708 may be a keyboard or pointing device such as a mouse. The communication interface 709 provides an interface for communicating with a network 726. An operating system 710 or applications 712 run on the processor 702. The memory 704 includes Random Access Memory (RAM) 716, Read Only Memory (ROM) 718, and a disk 720. In one example, the data processing system 700 may include either a client or a server. Any of the software modules or components mentioned above may be stored in the memory 704 for execution by the processor 702.

The embodiments described above are for the purpose of illustration only and are not intended to be limiting. While the present disclosure is described as a system and a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

A portion of the disclosure of this patent document may contain material that is subject to copyright protection. The copyright owner has no objection to the facsimile reproduction by anyone of the patent document or patent disclosure, as it appears in the Patent and Trademark Office patent file or records, but otherwise reserves all copyright.

The invention claimed is:

1. A system for managing one or more wireless devices in a wireless network, the system comprising:
   a processor;
   a memory accessible by the processor, the memory having stored thereon computer executable instructions to cause the system to implement data modules;
   a first data module having an interface layer for translating administration client-specific requests for device management operations to generic requests for the device management operations, the administration client-specific requests having administration client-specific standards; and
   a second data module having a single generic device manager for handling the generic requests translated by the interface layer and implementing the device management operations;
   wherein the interface layer includes one or more interface modules for interfacing with respective one or more administration clients and for performing the translating, each interface module being configured to support the respective one or more administration clients.

2. The system of claim 1 wherein the interface layer includes at least two interface modules each interfacing with a respective one of at least two administration clients, at least one of the at least two administration clients having administration client-specific standards different from at least another administration client.

3. The system of claim 1 wherein the one or more interface modules are individually configured to interface with at least one of: web browser-based administration clients, extensible markup language (XML)-based administration clients using a web service protocol, XML-based administration clients using a SOAP protocol, XML-based administration clients using hypertext transfer protocol (HTTP), or Open Mobile Alliance standard-based administration clients.

4. The system of claim 1 wherein the interface layer comprises a manager Application Program Interface (Mgr API) for communicating requests to the generic device manager.

5. The system of claim 1 wherein the device management operations implemented by the generic device manager further include other software application management operations.

6. The system of claim 1 wherein the device management operations further include at least one of: device search operations, device selection operations, software upgrade operations, scheduling operations, device monitoring operations, device configuration operations, or device information collection operations.

7. The system of claim 6 wherein the software application upgrade operations include at least one of: searching for available upgrades, selecting an upgrade, scheduling an upgrade, entering upgrade parameters, initiating an upgrade, monitoring progress of an upgrade, or reverting to a previous software version.

8. A method of managing one or more wireless devices in a wireless network, the method comprising:
   providing, in a server in the network, a single generic device manager for implementing device management operations;
   receiving, in the server, an administration client-specific request from an administration client, the administration client-specific request containing a set of device management operations and having an administration client-specific standard;

translating the administration client-specific request using an interface layer for translating administration client-specific requests to a generic request, the generic request containing the set of device management operations; and handling the generic request using the generic device manager to implement the set of device management operations on the one or more wireless devices;

wherein the interface layer includes one or more interface modules for interfacing with respective one or more administration clients and for performing the translating, each interface module being configured to support the respective one or more administration clients.

9. The method of claim 8 wherein the interface layer includes at least two interface modules each interfacing with a respective one of at least two administration clients, at least one of the at least two administration clients having administration client-specific standards different from at least another administration client.

10. The method of claim 8 wherein the one or more interface modules are individually configured to interface with at least one of: web browser-based administration clients, extensible markup language (XML)-based administration clients using a web service protocol, XML-based administration clients using a SOAP protocol, XML-based administration clients using hypertext transfer protocol (HTTP), or Open Mobile Alliance standard-based administration clients.

11. The method of claim 8 wherein the interface layer comprises a manager Application Program Interface (Mgr API) for communicating requests to the generic device manager.

12. The method of claim 8 wherein the device management operations implemented by the generic device manager further include other software application management operations.

13. The method of claim 8 wherein the device management operations further include at least one of: device search operations, device selection operations, software application upgrade operations, scheduling operations, device monitoring operations, device configuration operations, or device information collection operations.

14. The method of claim 13 wherein the software application upgrade operations include at least one of: searching for available upgrades, selecting an upgrade, scheduling an upgrade, entering upgrade parameters, initiating an upgrade, monitoring progress of an upgrade, or reverting to a previous software version.

15. A computer program product having a non-transitory computer readable storage medium tangibly embodying processor-executable instructions for device management, the instructions comprising:

code for providing a single generic device manager for implementing device management operations;

code for receiving an administration client-specific request from an administration client, the administration client-specific request containing a set of device management operations and having an administration client-specific standard;

code for translating the administration client-specific request using an interface layer for translating administration client-specific requests to a generic request, the generic request containing the set of device management operations; and code for handling the generic request using the generic device manager to implement the set of device management operations on the one or more wireless devices;

wherein the interface layer includes one or more interface modules for interfacing with respective one or more administration clients and for performing the translating, each interface module being configured to support the respective one or more administration clients.

16. The computer program product of claim 15 wherein the interface layer includes at least two interface modules each interfacing with a respective one of at least two administration clients, at least one of the at least two administration clients having administration client-specific standards different from at least another administration client.

17. The computer program product of claim 15 wherein the one or more interface modules are individually configured to interface with at least one of: web browser-based administration clients, extensible markup language (XML)-based administration clients using a web service protocol, XML-based administration clients using a SOAP protocol, XML-based administration clients using hypertext transfer protocol (HTTP), or Open Mobile Alliance standard-based administration clients.

18. The computer program product of claim 15 wherein the interface layer comprises a manager Application Program Interface (Mgr API) for communicating requests to the generic device manager.

19. The computer program product of claim 15 wherein the device management operations implemented by the generic device manager further include other software application management operations.

20. The computer program product of claim 15 wherein the device management operations further include at least one of: device search operations, device selection operations, software application upgrade operations, scheduling operations, device monitoring operations, device configuration operations, or device information collection operations.

21. The computer program product of claim 20 wherein the software application upgrade operations include at least one of: searching for available upgrades, selecting an upgrade, scheduling an upgrade, entering upgrade parameters, initiating an upgrade, monitoring progress of an upgrade, or reverting to a previous software version.

* * * * *